(12) United States Patent
Toyoshima

(10) Patent No.: US 8,800,355 B2
(45) Date of Patent: Aug. 12, 2014

(54) PRESSURE ACCUMULATION FUEL INJECTION DEVICE

(75) Inventor: Yoshio Toyoshima, Kariya (JP)

(73) Assignee: Denso Corporation, Kariya (JP)

( * ) Notice: Subject to any disclaimer, the term of this patent is extended or adjusted under 35 U.S.C. 154(b) by 1272 days.

(21) Appl. No.: 12/640,593

(22) Filed: Dec. 17, 2009

(65) Prior Publication Data
US 2010/0192910 A1 Aug. 5, 2010

(30) Foreign Application Priority Data
Jan. 30, 2009 (JP) .................................. 2009-019861

(51) Int. Cl.
*G01M 15/00* (2006.01)
(52) U.S. Cl.
USPC .......................... 73/114.43; 123/446; 123/447
(58) Field of Classification Search
USPC ......... 123/446, 447, 456, 457, 458, 467, 510; 73/114.38, 114.43
See application file for complete search history.

(56) References Cited

U.S. PATENT DOCUMENTS

| | | | | |
|---|---|---|---|---|
| 5,699,772 | A * | 12/1997 | Yonekawa et al. | 123/497 |
| 6,234,148 | B1 * | 5/2001 | Hartke et al. | 123/447 |
| 6,474,306 | B2 * | 11/2002 | Muller et al. | 123/479 |
| 7,143,747 | B2 * | 12/2006 | Uchiyama | 123/456 |
| 7,614,392 | B2 * | 11/2009 | Fukagai et al. | 123/688 |
| 8,155,859 | B2 * | 4/2012 | Nakata et al. | 701/103 |
| 2005/0103312 | A1 * | 5/2005 | Uchiyama | 123/457 |
| 2008/0306648 | A1 * | 12/2008 | Takahashi | 701/29 |
| 2008/0314364 | A1 * | 12/2008 | Okamoto | 123/458 |
| 2009/0025683 | A1 * | 1/2009 | Culbertson et al. | 123/446 |
| 2010/0274467 | A1 * | 10/2010 | Hayami | 701/103 |

FOREIGN PATENT DOCUMENTS

| | | |
|---|---|---|
| JP | 10-238392 | 9/1998 |
| JP | 2002-256952 | 9/2002 |
| JP | 2007-138774 | 6/2007 |
| JP | 2008-202593 | 9/2008 |

OTHER PUBLICATIONS

Japanese Office Action dated Feb. 8, 2011, issued in corresponding Japanese Application No. 2009-019861 with English Translation.

* cited by examiner

*Primary Examiner* — Thomas Moulis
*Assistant Examiner* — Joseph Dallo
(74) *Attorney, Agent, or Firm* — Nixon & Vanderhye PC

(57) ABSTRACT

When change of fuel pressure sensed with a fuel pressure sensor is small, it is temporarily determined that the fuel pressure sensor is abnormal. After the abnormality is temporarily determined, transfer quantity from a high-pressure fuel supply pump is increased and pressure reduction is performed by driving a pressure reducing valve, thereby increasing the change of the fuel pressure of a common rail. When the change of the fuel pressure sensed with the fuel pressure sensor is small thereafter, it is formally determined that the fuel pressure sensor is abnormal. Thus, a pressure accumulation fuel injection device can appropriately perform abnormality detection of the fuel pressure sensor, irrespective of existence/nonexistence of fuel leak from an injector.

8 Claims, 5 Drawing Sheets

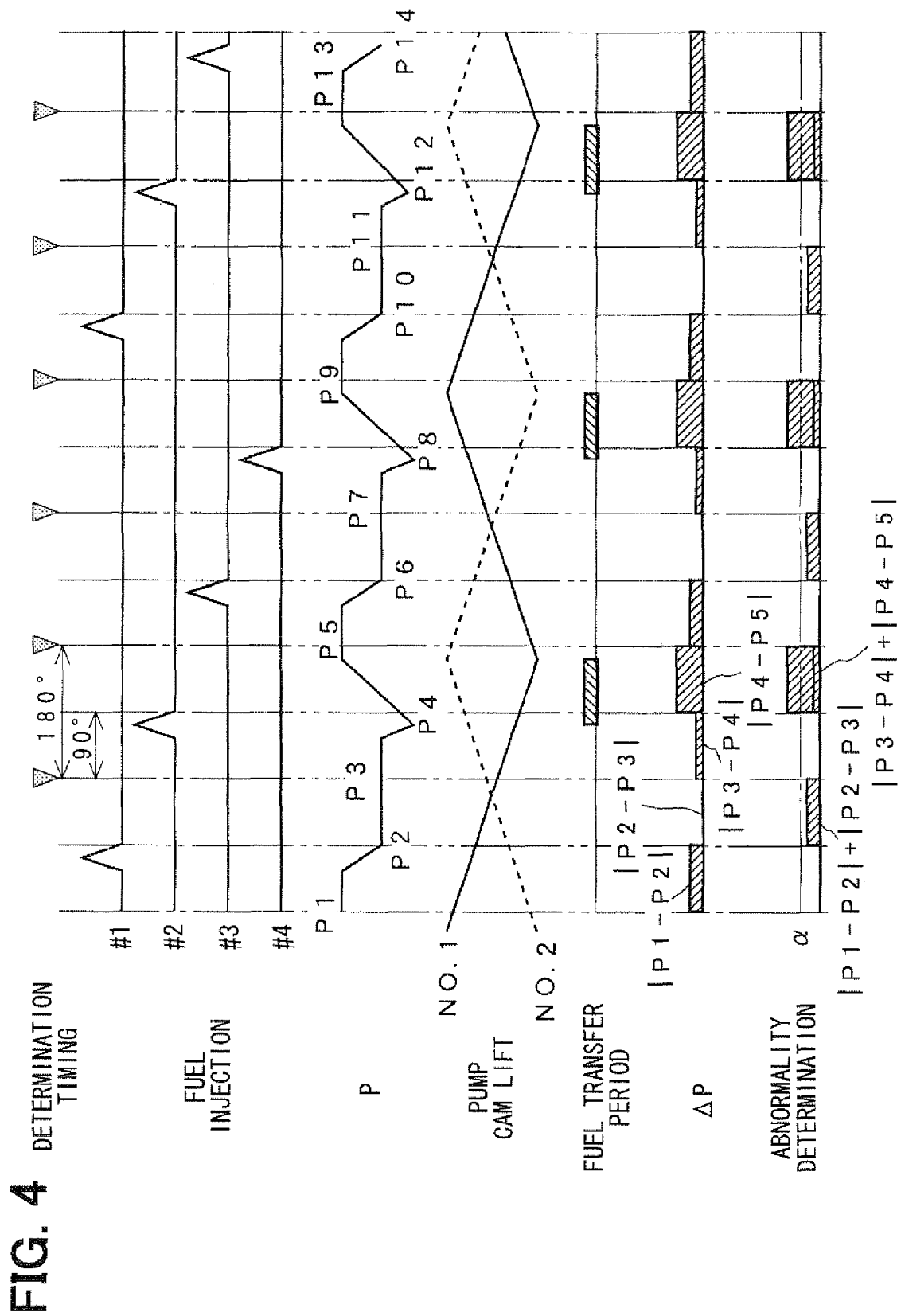

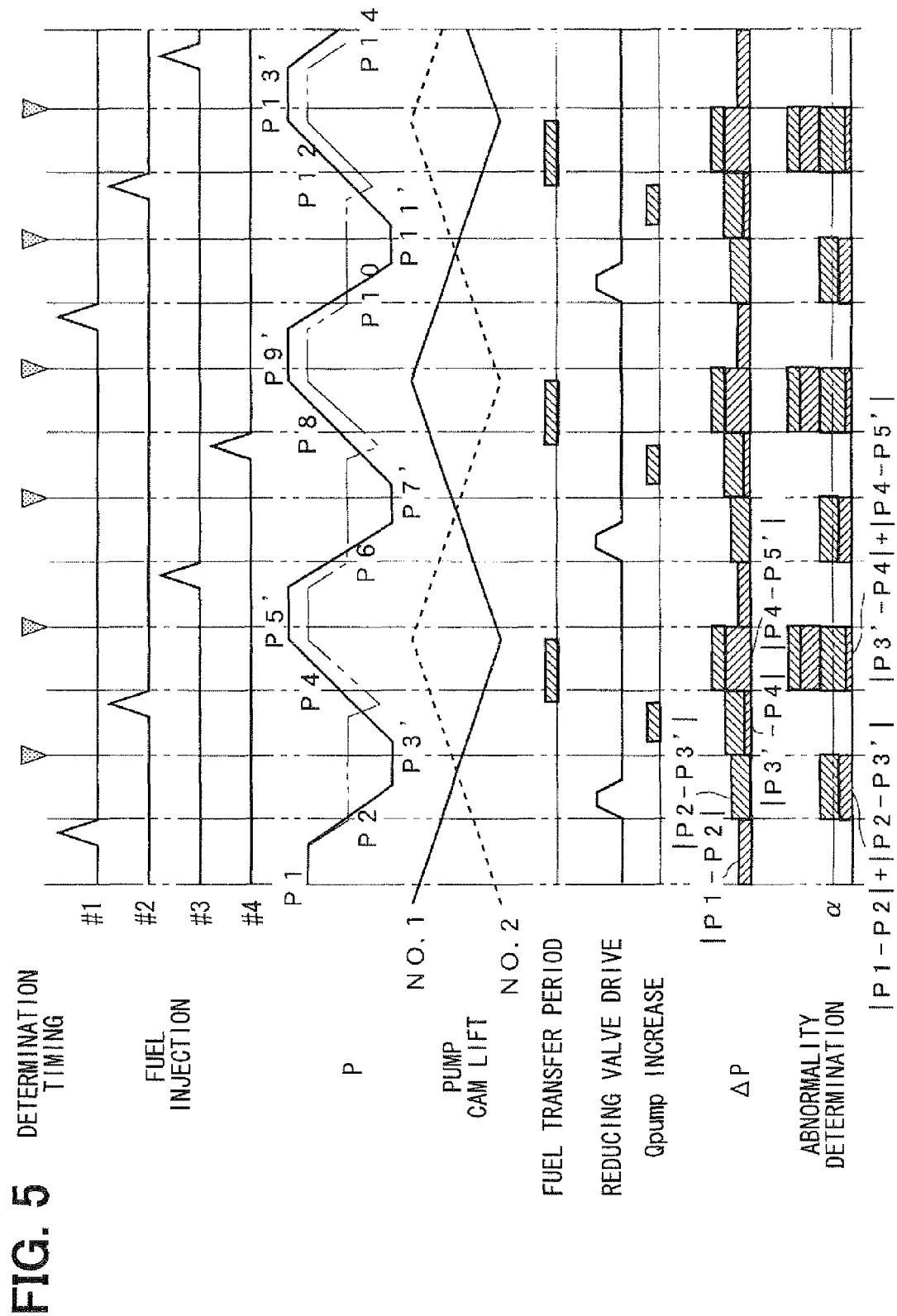

PRESSURE ACCUMULATION FUEL INJECTION DEVICE

CROSS REFERENCE TO RELATED APPLICATION

This application is based on and incorporates herein by reference Japanese Patent Application No. 2009-19861 filed on Jan. 30, 2009.

BACKGROUND OF THE INVENTION

1. Field of the Invention

The present invention relates to a pressure accumulation fuel injection device that supplies fuel from a common rail accumulating high-pressure fuel to an injector and in particular relates to a pressure accumulation fuel injection device that determines an abnormality of a fuel pressure sensing device sensing fuel pressure of the common rail.

2. Description of Related Art

Conventionally, as described in Patent document 1 (JP-A-2008-202593), a pressure accumulation fuel injection device that supplies fuel from a common rail to an injector supplies high-pressure fuel from a high-pressure fuel supply pump to the common rail and controls fuel pressure of the common rail by changing transfer quantity of the fuel from the high-pressure fuel supply pump.

In that case, the fuel injection device senses the fuel pressure of the common rail with a fuel pressure sensing device and controls the transfer quantity of the high-pressure fuel supply pump based on the sensed fuel pressure and target pressure such that a difference between the sensed fuel pressure and the target pressure decreases.

In such the conventional fuel injection device, if the sensed fuel pressure becomes substantially constant pressure due to an abnormality in the fuel pressure sensing device, the fuel injection device becomes unable to control the fuel pressure. In the worst case, there is a possibility that an internal combustion engine stops due to abnormal drop of the fuel pressure or there is a possibility that abnormally high fuel pressure causes failure of devices or fuel leak from fuel pipes or the like, leading to a fire hazard. Therefore, change in the fuel pressure before and after the fuel injection from the injector is sensed with the fuel pressure sensing device. If the pressure change amount is equal to or larger than a predetermined value, it is determined that the fuel pressure sensing device is operating normally. If the pressure change amount is smaller than the predetermined value, it is determined that the fuel pressure sensing device is abnormal and the abnormality is reported.

For example, the injector opens and closes a low-pressure passage extending from a pressure chamber, to which the high-pressure fuel of the common rail is applied, to a low-pressure side. If the low-pressure passage is opened due to energization and thus the fuel pressure in the pressure chamber decreases, a nozzle needle ascends and the injector opens. While the injector is open, the injector leaks the high-pressure fuel, which is supplied from the common rail, to a low-pressure flow passage side through the pressure chamber and therefore generates large quantity of the leaked fuel. Since the large quantity of the fuel leaks from the injector, the fuel pressure largely changes before and after the fuel injection from the injector and the change amount of the fuel pressure sensed by the fuel pressure sensing device increases.

However, the large quantity of the fuel leak causes lowering of a fuel efficiency. If an injector causing little or no fuel leak is used in order to improve the fuel consumption efficiency, it becomes difficult to obtain pressure change equal to or larger than the predetermined value. As a result, there is a possibility that the abnormality detection of the fuel pressure sensing device becomes difficult or erroneous determination is induced.

SUMMARY OF THE INVENTION

It is an object of the present invention to provide a pressure accumulation fuel injection device capable of appropriately performing abnormality detection of a fuel pressure sensing device, irrespective of existence/nonexistence of fuel leak from an injector.

According to a first example aspect of the present invention, a pressure accumulation fuel injection device has an injector that injects fuel into a cylinder of an internal combustion engine, a common rail that accumulates high-pressure fuel supplied from a high-pressure fuel supply pump and that supplies the fuel to the injector, and a fuel pressure sensing device that senses fuel pressure of the common rail. The fuel injection device controls the fuel pressure of the common rail based on the fuel pressure sensed with the fuel pressure sensing device.

The fuel injection device has a temporary abnormality determining section and a formal abnormality determining section. The temporary abnormality determining section temporarily determines that the fuel pressure sensing device is abnormal when change of the fuel pressure sensed with the fuel pressure sensing device is small. The formal abnormality determining section increases fuel transfer quantity from the high-pressure fuel supply pump after the temporary abnormality determining section temporarily determines the abnormality. The formal abnormality determining section formally determines that the fuel pressure sensing device is abnormal when change of the fuel pressure that is caused by the transfer quantity increase and sensed with the fuel pressure sensing device is small.

According to a second example aspect of the present invention, a pressure accumulation fuel injection device has an injector that injects fuel into a cylinder of an internal combustion engine, a common rail that accumulates high-pressure fuel supplied from a high-pressure fuel supply pump and that supplies the fuel to the injector, and a fuel pressure sensing device that senses fuel pressure of the common rail. The fuel injection device controls the fuel pressure of the common rail based on the fuel pressure sensed with the fuel pressure sensing device.

The fuel injection device has a pressure reducing valve, a temporary abnormality determining section and a formal abnormality determining section. The pressure reducing valve reduces the fuel pressure of the common rail. The temporary abnormality determining section temporarily determines that the fuel pressure sensing device is abnormal when change of the fuel pressure sensed with the fuel pressure sensing device is small. The formal abnormality determining section reduces the fuel pressure with the pressure reducing valve after the temporary abnormality determining section temporarily determines the abnormality and formally determines that the fuel pressure sensing device is abnormal when change of the fuel pressure that is caused by the fuel pressure reduction and sensed with the fuel pressure sensing device is small.

According to a third example aspect of the present invention, a pressure accumulation fuel injection device has an injector that injects fuel into a cylinder of an internal combustion engine, a common rail that accumulates high-pressure fuel supplied from a high-pressure fuel supply pump and that supplies the fuel to the injector, and a fuel pressure sensing device that senses fuel pressure of the common rail. The fuel injection device controls the fuel pressure of the common rail based on the fuel pressure sensed with the fuel pressure sensing device.

The fuel injection device has a temporary abnormality determining section and a formal abnormality determining section. The temporary abnormality determining section temporarily determines that the fuel pressure sensing device is abnormal when change of the fuel pressure sensed with the fuel pressure sensing device is small. The formal abnormality determining section increases fuel transfer quantity from the high-pressure fuel supply pump after the temporary abnormality determining section temporarily determines the abnormality. The formal abnormality determining section senses the fuel pressure with the fuel pressure sensing device in accordance with a fuel transfer period of the high-pressure fuel supply pump. The formal abnormality determining section formally determines that the fuel pressure sensing device is abnormal when change of the sensed fuel pressure is small.

According to a fourth example aspect of the present invention, a pressure accumulation fuel injection device has an injector that injects fuel into a cylinder of an internal combustion engine, a common rail that accumulates high-pressure fuel supplied from a high-pressure fuel supply pump and that supplies the fuel to the injector, and a fuel pressure sensing device that senses fuel pressure of the common rail. The fuel injection device controls the fuel pressure of the common rail based on the fuel pressure sensed with the fuel pressure sensing device.

The fuel injection device has a pressure reducing valve, a temporary abnormality determining section and a formal abnormality determining section. The pressure reducing valve reduces the fuel pressure of the common rail. The temporary abnormality determining section temporarily determines that the fuel pressure sensing device is abnormal when change of the fuel pressure sensed with the fuel pressure sensing device is small. The formal abnormality determining section reduces the fuel pressure with the pressure reducing valve after the temporary abnormality determining section temporarily determines the abnormality. The formal abnormality determining section senses the fuel pressure with the fuel pressure sensing device in accordance with a fuel transfer period of the high-pressure fuel supply pump. The formal abnormality determining section formally determines that the fuel pressure sensing device is abnormal when change of the sensed fuel pressure is small.

According to a fifth example aspect of the present invention, the formal abnormality determining section reduces the fuel pressure with the pressure reducing valve at timing that is posterior to the fuel injection from the injector and that is outside the fuel transfer period of the high-pressure fuel supply pump.

According to a sixth example aspect of the present invention, the temporary abnormality determining section senses the fuel pressure before and after the fuel injection from the injector with the fuel pressure sensing device and temporarily determines that the fuel pressure sensing device is abnormal when change of the sensed fuel pressure is small.

According to a seventh example aspect of the present invention, the temporary abnormality determining section senses the fuel pressure with the fuel pressure sensing device in accordance with a fuel transfer period of the high-pressure fuel supply pump and temporarily determines that the fuel pressure sensing device is abnormal when change of the sensed fuel pressure is small.

The pressure accumulation fuel injection device according to the present invention temporarily determines that the fuel pressure sensing device is abnormal when the change of the fuel pressure sensed with the fuel pressure sensing device is small. After the abnormality is temporarily determined, the transfer quantity from the high-pressure fuel supply pump is increased or the pressure reducing valve is driven to reduce the fuel pressure. If the change of the fuel pressure sensed with the fuel pressure sensing device is small, it is formally determined that the fuel pressure sensing device is abnormal. Therefore, even when the injector has a structure that causes small quantity of leak fuel or no leak fuel, the abnormality detection of the fuel pressure sensing device can be performed appropriately, irrespective of existence/nonexistence of the leak fuel from the injector.

By sensing the fuel pressure with the fuel pressure sensing device in accordance with the fuel transfer period of the high-pressure fuel supply pump, the fuel pressure can be sensed when large change arises in the fuel pressure. Thus, the abnormality detection of the fuel pressure sensing device can be performed appropriately.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIG. 4 is a timing chart showing relationships among fuel injection, fuel pressure, fuel transfer, pressure change amount and abnormality determination in a case of temporary determination according to the embodiment; and FIG. 5 is a timing chart showing relationships among fuel injection, fuel pressure, fuel transfer, pressure change amount and abnormality determination in a case of formal determination according to the embodiment.

DETAILED DESCRIPTION OF EXAMPLE EMBODIMENT

Figure 1:
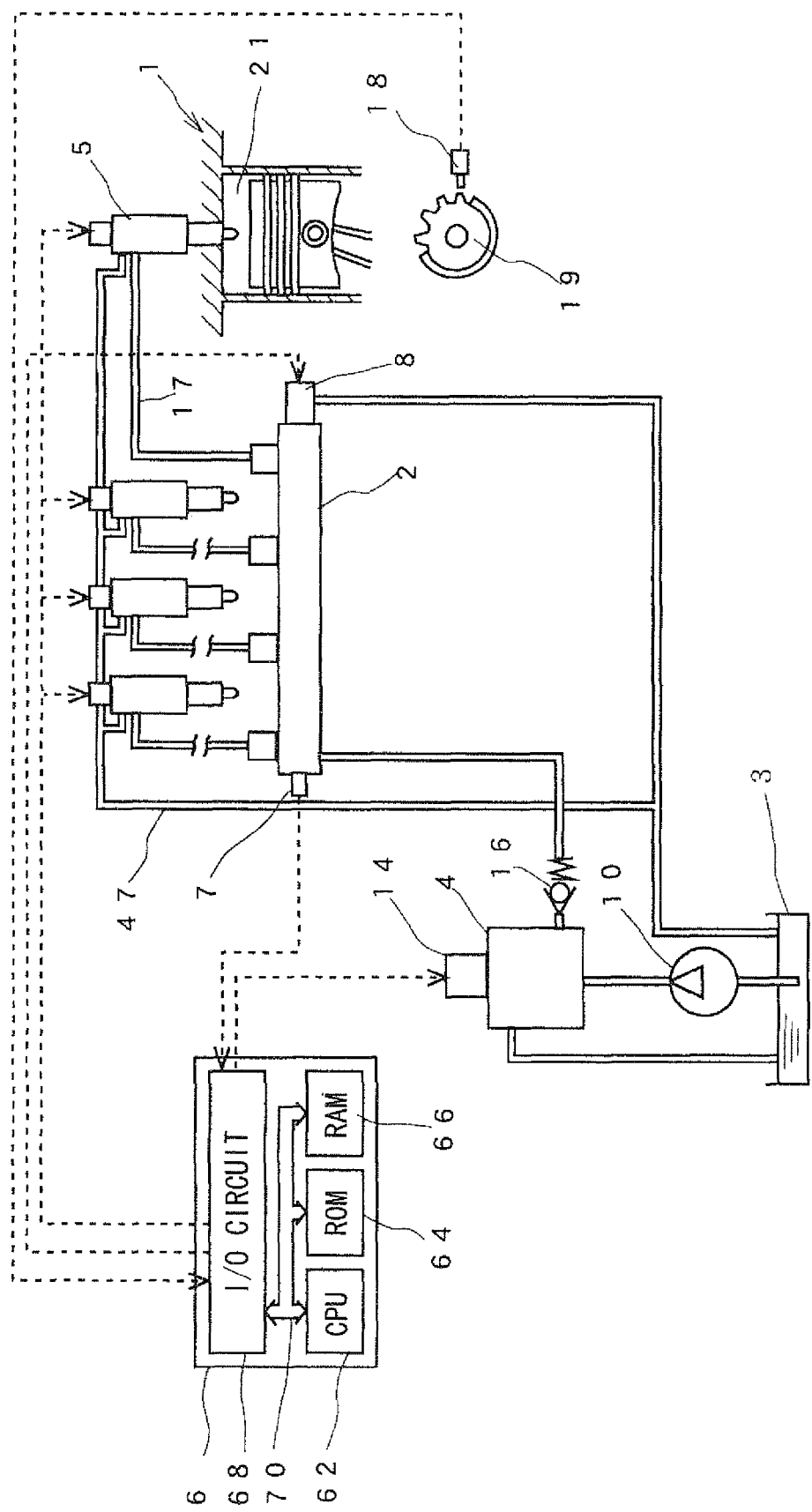
FIG. 1 is an entire configuration diagram showing a pressure accumulation fuel injection device according to an embodiment of the present invention.

Hereinafter, an embodiment of the present invention will be described with reference to the drawings. FIG. 1 is an entire configuration diagram showing a pressure accumulation fuel injection device according to an embodiment of the present invention.

As shown in FIG. 1, the pressure accumulation fuel injection device according to the present embodiment is applied to an internal combustion engine 1, which is a four-cylinder diesel engine, for example. The fuel injection device has a common rail 2 that accumulates high-pressure fuel, a high-pressure fuel supply pump 4 that pressurizes fuel drawn from a fuel tank 3 by a feed pump 10 and supplies the fuel to the common rail 2, an injector 5 that injects the high-pressure fuel supplied from the common rail 2 to a combustion chamber 21 in a cylinder of the internal combustion engine 1 and an electronic control unit 6 (ECU) that performs electronic control of the injector 5 and the like.

The ECU 6 sets target pressure of the common rail 2 based on an operation state and the like. The common rail 2 accumulates the high-pressure fuel supplied from the high-pressure fuel supply pump 4 to the target pressure. A fuel pressure sensor 7 as a fuel pressure sensing device and a pressure reducing valve 8 are attached to the common rail 2. The fuel pressure sensor 7 senses the accumulated fuel pressure and outputs the sensed fuel pressure to the ECU 6. The pressure reducing valve 8 releases the high-pressure fuel in the common rail 2 to the fuel tank 3 to reduce the fuel pressure in the common rail 2.

The high-pressure fuel supply pump 4 causes a plunger (not shown) to reciprocate by using a cam (not shown), which is driven by the internal combustion engine 1 to rotate. Thus, the high-pressure fuel supply pump 4 discharges the high-pressure fuel once per two times of rotation of the internal combustion engine to the common rail 2 alternately from two pressurization chambers (not shown). The fuel drawn from the fuel tank 3 by the feed pump 10 is supplied to the high-pressure fuel supply pump 4. A pressure metering valve 14 that adjusts the fuel quantity suctioned from the feed pump 10 is provided to the high-pressure fuel supply pump 4.

The fuel sent out from the feed pump 10 is metered by the pressure metering valve 14 and is suctioned into the high-pressure fuel supply pump 4. The fuel pressurized by the high-pressure fuel supply pump 4 pushes and opens a discharge valve 16 and is pumped to the common rail 2.

The pressure metering valve 14 slides a valve member (not shown) according to an inputted control current to adjust the fuel sent out from the feed pump 10, thereby varying the transfer quantity supplied from the high-pressure fuel supply pump 4 to the common rail 2.

Figure 2:
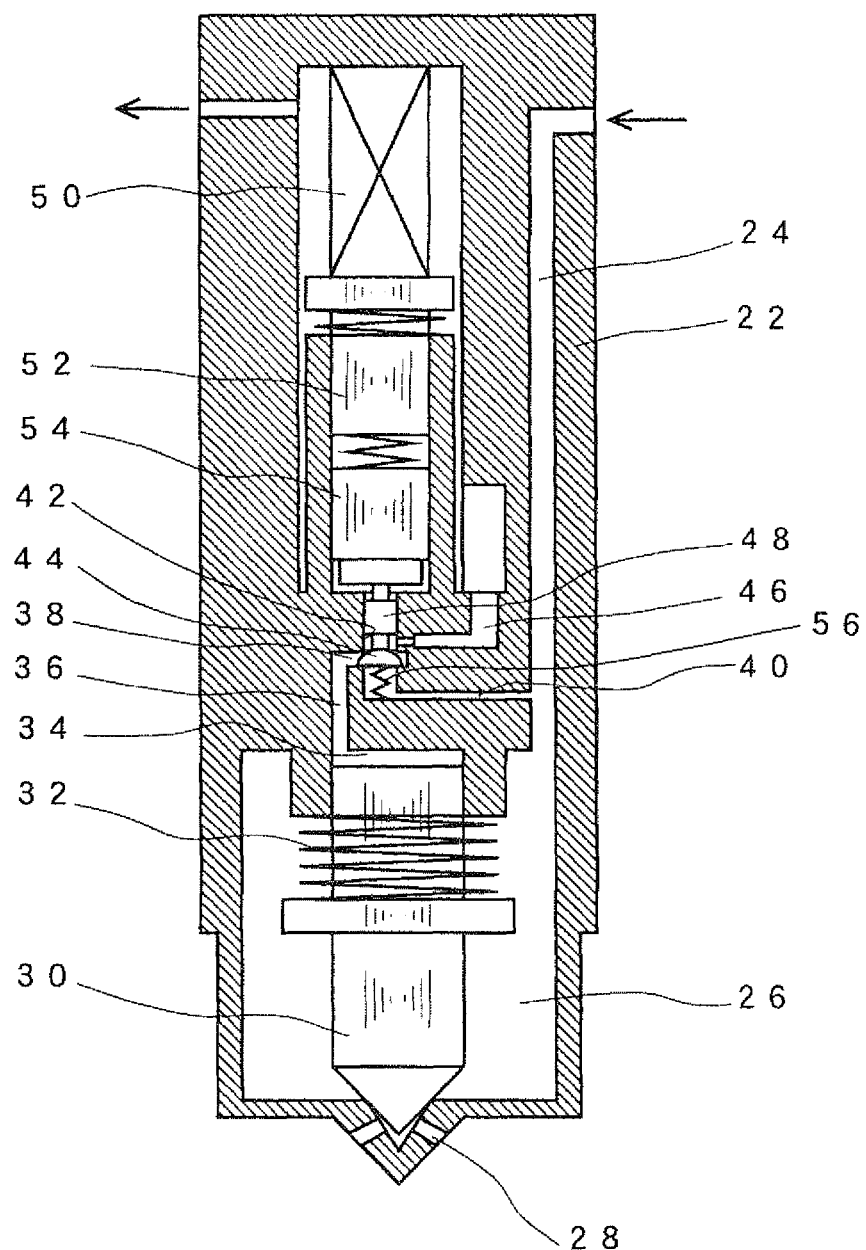
FIG. 2 is an expanded sectional view showing an injector according to the embodiment.

The injector 5 is mounted to each cylinder of the internal combustion engine 1. As shown in FIG. 2, a high-pressure flow passage 24 is formed in a main body 22 of the injector 5 and connected to the common rail 2 through a high-pressure pipe 17. The high-pressure flow passage 24 communicates with an oil sump chamber 26 formed in the main body 22. An injection hole 28 communicating with the oil sump chamber 26 is formed.

A nozzle needle 30 slidably supported by the main body 22 is provided in the oil sump chamber 26. The nozzle needle 30 receives fuel pressure of the oil sump chamber 26 in a valve opening direction. The nozzle needle 30 is structured such that the nozzle needle 30 is biased by a spring 32 in a valve closing direction for blocking the injection hole 28 and also the nozzle needle 30 receives an acting force in the valve closing direction caused by introduction of the high-pressure fuel into a pressure chamber 34 provided on a back side of the nozzle needle 30.

A communication flow passage 36 is connected to the pressure chamber 34, and the communication flow passage 36 is connected to a valve chamber 38. A connecting flow passage 40, which is connected to the high-pressure flow passage 24, and a slide hole 42 are connected to the valve chamber 38 to face each other. A valve member 44 is provided in the valve chamber 38, and the valve chamber 38 is structured to be able to switch between communication between the valve chamber 38 and the connecting flow passage 40 and communication between the valve chamber 38 and the slide hole 42 by movement of the valve member 44.

A return flow passage 46 is connected to the slide hole 42. The return flow passage 46 is connected to the fuel tank 3 through a leak flow passage 47. A sliding pin 48 is slidably inserted in the slide hole 42. If a piezo actuator 50 extends, the sliding pin 48 is moved through a first piston 52 and a second piston 54 to press down the valve member 44 and to provide the communication between the valve chamber 38 and the slide hole 42. The valve member 44 moves due to a spring 56 and fuel pressure in the connecting flow passage 40, thereby providing the communication between the valve chamber 38 and the connecting flow passage 40.

When the valve member 44 is moved by the spring 56 and the fuel pressure in the connecting flow passage 40 and provides the communication between the valve chamber 38 and the connecting flow passage 40, the high-pressure fuel is introduced into the pressure chamber 34 through the common rail 2, the high-pressure flow passage 24, the connecting flow passage 40, the valve chamber 38 and the communication flow passage 36. Thus, the acting force acting on the nozzle needle 30 in the valve-closing direction exceeds the acting force in the valve-opening direction. Accordingly, the nozzle needle 30 is slid to block the injection hole 28, thereby closing the injector 5. In the present embodiment, when the injector 5 is closed, the communication between the valve chamber 38 and the slide hole 42 is blocked. Therefore, there is no leak of the high-pressure fuel.

When the valve member 44 is moved by the extension of the piezo actuator 50 and provides the communication between the valve chamber 38 and the connecting flow passage 40, the pressure chamber 34 is connected with the return flow passage 46 through the communication flow passage 36, the valve chamber 38 and the slide hole 42. Thus, the high-pressure fuel is leaked to the fuel tank 3 through the leak flow passage 47. Thus, the acting force acting on the nozzle needle 30 in the valve-opening direction exceeds the acting force in the valve-closing direction. Accordingly, the nozzle needle 30 is slid to open the injection hole 28. Thus, the fuel is injected from the injection hole 28.

In the present embodiment, the high-pressure fuel is leaked when the injector 5 is open. However, the leaked fuel quantity is small quantity corresponding to the sliding movement of the nozzle needle 30. Since the high-pressure fuel is not leaked constantly, a fuel efficiency and the like can be improved.

The above-described sensors and the like are connected to the ECU 6. As shown in FIG. 1, the ECU 6 is constituted mainly by CPU 62, ROM 64, RAM 66 and the like as a logic operation circuit. The components of the ECU 6 such as the CPU 62, the ROM 64 and the RAM 66 are mutually connected with an input/output circuit 68, which performs input/output with an exterior, through a common bus 70.

The CPU 62 receives input signals from the fuel pressure sensor 7 and a rotation sensor 18 through the input/output circuit 68. The rotation sensor 18 uses an electromagnetic pickup that detects multiple teeth formed on a pulse device 19. The CPU 62 calculates the target pressure of the common rail 2, injection timing and injection quantity suitable for the operation state of the internal combustion engine 1 and the like based on these signals, data in the ROM 64 and the RAM 66 and control programs stored beforehand. The CPU 62 electronically controls the pressure metering valve 14 and the injector 5 according to the calculation result.

Figure 3:
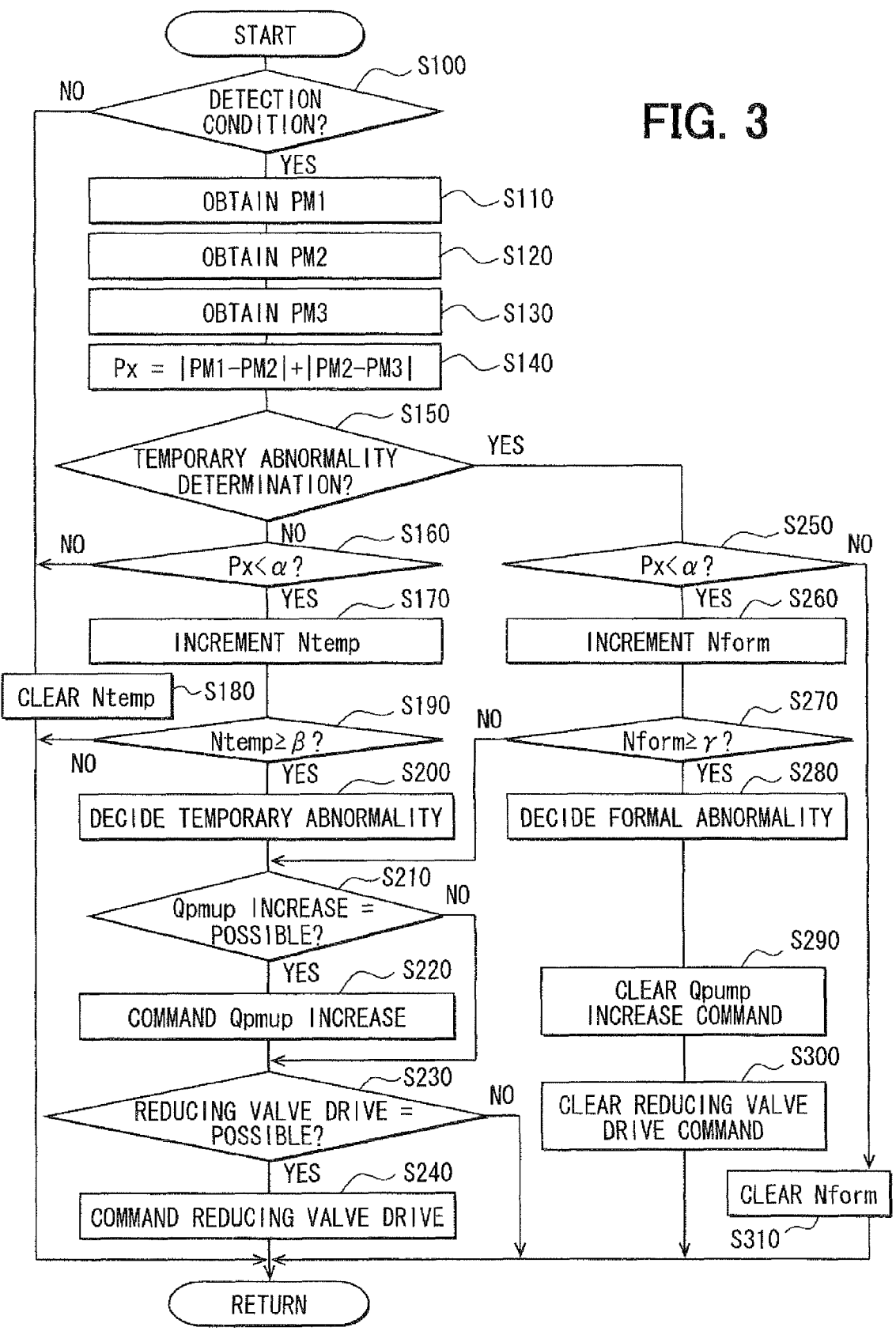
FIG. 3 is a flowchart showing an example of abnormality determination processing performed by an electronic control unit according to the embodiment.

Next, abnormality determination processing performed by the ECU 6 will be explained based on a flowchart shown in FIG. 3.

First, the fuel pressure of the common rail 2 is sensed with the fuel pressure sensor 7 and stored at every 90 degrees of the rotation angle (rotation angle of crankshaft) sensed with the rotation sensor 18. In the present embodiment, the fuel pressure PM1 sensed at a rotation angle preceding the present rotation angle by 180 degrees is stored in a first storage area M1 of the RAM 66. The fuel pressure PM2 sensed at the rotation angle preceding the present rotation angle by 90 degrees is stored in a second storage area M2 of the RAM 66. The fuel pressure PM3 sensed at the present rotation angle is stored in a third storage area M3 of the RAM 66. The fuel pressure P newly sensed at every 90 degrees of the rotation angle is stored in the third storage area M3, and the previously sensed fuel pressure P is moved forward to the immediately preceding storage area and stored. Abnormality determination processing is performed at every 180 degrees of the rotation angle (rotation angle of crankshaft). Although the pressure P is sensed at every 90 degrees and the abnormality determination processing is performed at every 180 degrees in the present embodiment, the rotation angles are not limited to these angles. Alternatively, the pressure sensing and the abnormality determination processing may be performed at every smaller angles.

In the abnormality determination processing, it is determined in S100 (S means "Step") whether a condition for detecting an abnormality in the fuel pressure sensor 7 is established. The establishment of the detection condition is determined by determining whether the fuel injection from the injector 5 is being performed and whether the high-pressure fuel supply pump 4, the feed pump 10, the pressure reducing valve 8 and the injector 5 are operating normally.

When the fuel injection is being performed and the operation is performed normally, it is determined that the detection condition is established, and the pressure value PM1 of the fuel pressure stored in the first storage area M1 is obtained in S110. Subsequently, the pressure value PM2 of the fuel pressure stored in the second storage area M2 is obtained in S120, and the pressure value PM3 of the fuel pressure stored in the third storage area M3 is obtained in S130.

Then, a determination pressure change amount Px for determination is calculated from the three pressure values PM1, PM2, PM3 based on a following expression (1) in S140. That is, in the present embodiment, the pressure change amounts ΔP at the every 90 degrees are calculated and summed to calculate the determination pressure change amount Px of every 180 degrees.

$$Px=|PM1-PM2|+|PM2-PM3| \quad (1)$$

Then, it is determined in S150 whether temporary abnormality determination is present based on whether a temporary abnormality has been decided by execution of processing of S200 (explained later). When it is determined that the temporary abnormality determination is not present (S150: NO), it is determined in S160 whether the determination pressure change amount Px calculated by the processing of S140 is smaller than a preset abnormality determination value α.

When the determination pressure change amount Px is greater than the abnormality determination value α, it is determined that the fuel pressure sensor 7 is operating normally. When the determination pressure change amount Px is smaller than the abnormality determination value α, it is determined that the fuel pressure sensor 7 cannot sense the fuel pressure normally.

When the determination pressure change amount Px is smaller than the abnormality determination value α (S160: YES), it is determined that there is a possibility that the fuel pressure sensor 7 is abnormal and a temporary abnormality time number counter Ntemp is incremented in S170. When the determination pressure change amount Px is greater than the abnormality determination value α (S160: NO), it is determined that the fuel pressure sensor 7 is normal and the temporary abnormality time number counter Ntemp is cleared in S180. Then, the abnormality determination processing is ended once and the abnormality determination processing is repeatedly performed at every 180 degrees of the rotation angle.

After the temporary abnormality time number counter Ntemp is incremented by the processing of S170, it is determined in S190 whether the temporary abnormality time number counter Ntemp value is "equal to or greater than" a predetermined value β. When the temporary abnormality time number counter Ntemp value is smaller than the predetermined value β (S190: NO), the abnormality determination processing is repeatedly performed at every 180 degrees of the rotation angle. When it is continuously determined that the determination pressure change amount Px is smaller than the abnormality determination value α in the processing of S160 and eventually the temporary abnormality time counter Ntemp value becomes equal to or greater than the predetermined value β, the temporary abnormality is decided in S200.

As shown in FIG. 4, in the present embodiment, the fuel pressure P of the common rail 2 is sensed at every 90 degrees of the rotation angle (rotation angle of crankshaft), and the abnormality determination processing is performed at every 180 degrees of the rotation angle (rotation angle of crankshaft). Thus, the pressure change amount ΔP at every 90 degrees of the rotation angle is calculated, and the pressure change amounts ΔP during every 180 degrees are summed at every 180 degrees to calculate the determination pressure change amount Px:

At the determination timing after the fuel injection from the injector 5 of the cylinder #1 is performed, the fuel pressure P1 at the rotation angle preceding the determination timing by 180 degrees is stored as the fuel pressure PM1 in the first storage area M1, the fuel pressure P2 at the rotation angle preceding the determination timing by 90 degrees is stored as the fuel pressure PM2 in the second storage area M2, and the fuel pressure P3 at the determination timing is stored as the fuel pressure PM3 in the third storage area M3.

By the expression (1) mentioned above, the pressure change amount between the fuel pressures P1, P2 before and after the fuel injection from the injector 5 of the cylinder #1 and the pressure change amount at the timing when the rotation angle proceeds by 90 degrees thereafter are summed to calculate the determination pressure change amount Px as follows.

$$Px=|P1-P2|+|P2-P3|$$

In the present embodiment, since the leak fuel quantity from the injector 5 is small, the pressure change amount before and after the fuel injection is small. Therefore, there is a possibility that the pressure change amount is determined to be smaller than the abnormality determination value α in the comparison determination with the abnormality determination value α in the processing of S160.

The abnormality determination processing is repeatedly performed. During a period to the next determination timing, the fuel injection is performed from the injector 5 of the cylinder #2 and the high-pressure fuel is supplied from the high-pressure fuel supply pump 4 to the common rail 2.

At the present determination timing, the fuel pressure P3 at the previous determination timing is stored as the fuel pressure PM1 in the first storage area M1, fuel pressure P4 at the rotation angle preceding the present determination timing by 90 degrees is stored as the fuel pressure PM2 in the second storage area M2, and fuel pressure P5 at the present determination timing is stored as the fuel pressure PM3 in the third storage area M3. The determination pressure change amount Px at the present determination timing is calculated as follows.

$$Px=|P3-P4|+|P4-P5|$$

Since the pressure change amount |P4−P5| due to the fuel supply is added to the pressure change amount |P3−P4| before and after the fuel injection, the determination pressure change amount Px becomes a relatively large value. Accordingly, the determination pressure change amount Px is determined to be larger than the abnormality determination value α in the comparison determination with the abnormality determination value α in the processing of S160. However, if the pressure change amount |P3−P4| before and after the fuel injection or the pressure change amount |P4−P5| due to the fuel supply is small, the determination pressure change amount Px becomes also a small value. In such the case, there is a possibility that the determination pressure change amount Px is continuously determined to be smaller than the abnormality determination value α during the execution of the processing of S160 though the fuel pressure sensor 7 is operating normally.

The abnormality determination processing is repeatedly performed, and when the determination pressure change amount Px is continuously determined to be smaller than the abnormality determination value α, the temporary abnormality is decided first in S200. Then, it is determined whether the fuel transfer quantity Qpump supplied from the high-pressure fuel supply pump 4 to the common rail 2 can be increased in S210. The fuel transfer quantity Qpump cannot be increased when the fuel pressure P of the common rail 2 is low and therefore the fuel is supplied near the maximum fuel transfer rate of the high-pressure pressure fuel supply pump 4 or when the fuel pressure P of the common rail 2 is high and therefore the fuel pressure P will become excessively high if the fuel is supplied to the common rail 2.

When there is a room for the fuel supply from the high-pressure fuel supply pump 4, it is determined that the increase of the fuel transfer quantity Qpump is possible (S210: YES), and a command for increasing the fuel transfer quantity Qpump from the high-pressure fuel supply pump 4 is outputted in S220. The increase amount may be a preset fixed quantity.

Then, it is determined whether the fuel pressure P of the common rail 2 can be reduced by driving the pressure reducing valve 8 in S230. The processing of S230 is performed without performing the processing of S220 also when the processing of S210 determines that the fuel transfer quantity Qpump from the high-pressure fuel supply pump 4 cannot be increased.

For example, even if the pressure reducing valve 8 is driven during the fuel supply from the high-pressure fuel supply pump 4 to the common rail 2, the change of the fuel pressure P of the common rail 2 is small and the effect of the drive of the pressure reducing valve 8 is small. The pressure reducing valve 8 cannot be driven also when the fuel pressure P of the common rail 2 falls to cause a trouble in the fuel injection if the pressure reducing valve 8 is driven to decrease the fuel pressure P.

When the pressure reduction can be performed by driving the pressure reducing valve 8 in the other cases (S230: YES), the drive of the pressure reducing valve 8 is commanded in S240. The drive of the pressure reducing valve 8 may be performed for a preset fixed period. For example, the pressure reducing valve 8 may be driven for a fixed period after the fuel injection is performed with the injector 5 and before the fuel supply from the high-pressure fuel supply pump 4 is performed as shown in FIG. 4. After the drive is commanded, the abnormality determination processing is repeatedly performed.

When it is determined by the processing of S150 that the temporary abnormality has been decided by the processing of S200 and the temporary abnormality determination is present (S150: YES), it is determined whether the determination pressure change amount Px is smaller than a preset abnormality determination value α in S250.

While the temporary abnormality determination is present, the transfer quantity Qpump of the high-pressure fuel supply pump 4 is increased or the pressure reduction is performed by the drive of the pressure reducing valve 8 by the execution of the processing of S220 or S240. Thus, the change in the fuel pressure P of the common rail 2 enlarges. As shown in FIG. 5, the fuel pressure P of the common rail 2 decreases due to the fuel injection in the cylinder #1, and the fuel pressure P further decreases due to the drive of the pressure reducing valve 8. The fuel pressure P increases due to the increased fuel supply from the high-pressure fuel supply pump 4, and the fuel pressure P becomes higher than the pressure during the normal fuel injection control period by amount corresponding to the increased fuel supply quantity.

The abnormality determination processing is repeatedly performed, and at the determination timing after the fuel injection from the injector 5 of the cylinder #1, the fuel pressure P1 sensed at the rotation angle preceding the determination timing by 180 degrees and stored as the fuel pressure PM1 in the first storage area M1, the fuel pressure P2 sensed at the rotation angle preceding the determination timing by 90 degrees and stored as the fuel pressure PM2 in the second storage area M2, and the fuel pressure P3' sensed at the determination timing and stored as the fuel pressure PM3 in the third storage area M3 are obtained by the execution of the processing of S110 to S130.

By the expression (1) mentioned above, the pressure change amount between the fuel pressures P1, P2 before and after the fuel injection from the injector 5 of the cylinder #1 and the pressure change amount at the timing when the rotation angle proceeds by 90 degrees thereafter are summed to calculate the determination pressure change amount Px as follows.

$$Px=|P1-P2|+|P2-P3'|$$

Due to the drive of the pressure reducing valve 8, the pressure value P3' sensed immediately after the drive of the pressure reducing valve 8 changes more largely as shown in FIG. 5 than the normal change shown in FIG. 4. Therefore, the value of the term |P2−P3'| increases, and therefore, the determination pressure change amount Px also increases. If the fuel pressure sensor 7 operates normally and senses the pressure values P1, P2, P3' normally, the determination pressure change amount Px exceeds the abnormality determination value α.

However, if the fuel pressure sensor 7 does not operate normally, no difference occurs among the pressure values P1, P2, P3' though the pressure reducing valve 8 is driven to increase the pressure fluctuation. Accordingly, the determination pressure change amount Px becomes smaller than the abnormality determination value α.

The abnormality determination processing is repeatedly performed, and the fuel supply is performed from the high-pressure fuel supply pump 4 and the transfer quantity Qpump is increased before the next determination timing, which is later than the present determination timing by 180 degrees of the rotation angle. If the fuel supply is started, the fuel pressure P of the common rail 2 increases and the fuel pressure becomes higher than the normal fuel pressure by amount corresponding to the increased amount of the fuel supply.

By the execution of the processing of S110 to S130, the fuel pressure P3' sensed at the rotation angle preceding the determination timing by 180 degrees and stored as the fuel pressure PM1 in the first storage area M1, the fuel pressure P4 sensed at the rotation angle preceding the determination timing by 90 degrees and stored as the fuel pressure PM2 in the second storage area M2, and the fuel pressure P5' sensed at the determination timing and stored as the fuel pressure PM3 in the third storage area M3 are obtained. By the execution of the processing of S140, the determination pressure change amount Px is calculated as follows.

$$Px = |P3'-P4| + |P4-P5'|$$

Due to the increase in the transfer quantity Qpump from the high-pressure fuel supply pump 4, the sensed pressure values P4, P5' change more largely than the normal changes shown in FIG. 4. Therefore, the values of the term |P3'−P4| and the term |P4−P5| increase, and therefore, the determination pressure change amount Px also increases. If the fuel pressure sensor 7 operates normally and senses the pressure values P3', P4, P5' normally, the determination pressure change amount Px exceeds the abnormality determination value α.

However, if the fuel pressure sensor 7 does not operate normally, no difference occurs among the sensed pressure values P3', P4, P5' though the transfer quantity Qpump from the high-pressure fuel supply pump 4 is increased to increase the pressure fluctuation. Accordingly, the determination pressure change amount Px becomes smaller than the abnormality determination value α. The abnormality determination values of S160 and S250 may be the same value. Alternatively, different values may be set by experiment or the like.

The abnormality determination processing is performed repeatedly and also performed in the same way at the determination timings corresponding to the other cylinders #3 and #4. If it is determined in S250 that the determination pressure change amount Px is smaller than the preset abnormality determination value α (S250: YES), a formal abnormality time number counter Nform is incremented in S260.

When the determination pressure change amount Px is greater than the abnormality determination value α (S250: NO), it is determined that the fuel pressure sensor 7 is normal and the formal abnormality time number counter Nform is cleared in S310. Then, the abnormality determination processing is repeatedly performed.

After the formal abnormality time number counter Nform is incremented, it is determined in S270 whether the formal abnormality time number counter Nform value is "equal to or greater than" a predetermined value γ. When the formal abnormality time number counter Nform value is smaller than the predetermined value γ (S270: NO), the processing from S210 is performed. Thus, the transfer quantity increase command for the high-pressure fuel supply pump 4 and the drive command for the pressure reducing valve 8 are outputted in accordance with the operating state.

The processing is repeatedly performed at every 180 degrees of the rotation angle. If it is continuously determined in S250 that the determination pressure change amount Px is smaller than the abnormality determination value α and eventually the formal abnormality time number counter Nform value becomes equal to or greater than the predetermined value γ, it is determined that the fuel pressure sensor 7 is not operating normally, and the formal abnormality is decided in S280. After the formal abnormality is decided, the transfer quantity increase command of the high-pressure fuel supply pump 4 is cleared in S290 and the drive command of the pressure reducing valve 8 is cleared in S300. When the formal abnormality is decided, the abnormality of the fuel pressure sensor 7 may be reported to the driver.

In this way, when the change of the fuel pressure P sensed with the fuel pressure sensor 7 is small, it is temporarily determined first that the fuel pressure sensor 7 is abnormal. After the abnormality is temporarily determined, the transfer quantity Qpump from the high-pressure fuel supply pump 4 is increased and the pressure reduction is performed by driving the pressure reducing valve 8, thereby increasing the change of the fuel pressure P of the common rail 2. When the change of the fuel pressure P sensed with the fuel pressure sensor 7 is small, it is formally determined that the fuel pressure sensor 7 is abnormal.

If the injector 5 has the structure that causes small leak fuel quantity or no leak fuel, the change of the fuel pressure P of the common rail 2 before and after the fuel injection is small. According to the present invention, even when such the injector 5 is used and the change of the fuel pressure P of the common rail 2 before and after the fuel injection from the injector 5 is small, the abnormality detection of the fuel pressure sensor 7 can be performed appropriately, irrespective of the existence/nonexistence of the leak fuel from the injector 5.

By sensing the fuel pressure with the fuel pressure sensor 7 in accordance with the fuel transfer period of the high-pressure fuel supply pump 4, the fuel pressure P can be sensed when large change arises in the fuel pressure P. Thus, the abnormality detection of the fuel pressure sensor 7 can be performed appropriately.

In the present embodiment, the processing of S160 to S200 functions as a temporary abnormality determining section and the processing of S210 to S280 functions as a formal abnormality determining section.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure accumulation fuel injection device having an injector that injects fuel into a cylinder of an internal combustion engine, a common rail that accumulates high-pressure fuel supplied from a high-pressure fuel supply pump and that supplies the fuel to the injector, and a fuel pressure sensing device that senses fuel pressure of the common rail, wherein the fuel injection device controls the fuel pressure of the common rail based on the fuel pressure sensed with the fuel pressure sensing device, the fuel injection device comprising:
   a pressure reducing valve that reduces the fuel pressure of the common rail;
   a temporary abnormality determining means for temporarily determining that the fuel pressure sensing device is abnormal when change of the fuel pressure sensed with the fuel pressure sensing device is smaller than a preset temporary abnormality determination value; and
   a formal abnormality determining means for formally determining that the fuel pressure sensing device is abnormal when both a first change of the fuel pressure and a second change of the fuel pressure are smaller than a preset formal abnormality determination value, wherein
   after the temporary abnormality determining means temporarily determines that the fuel pressure sensing device is abnormal, the formal abnormality determining means detects the first change in the fuel pressure with the fuel pressure sensing device by reducing the fuel pressure with the pressure reducing valve after fuel injection from the fuel injector, the formal abnormality determining means detecting the second change in the fuel pressure with the fuel pressure sensing device by increasing fuel transfer quantity from the high-pressure fuel supply pump after reducing the fuel pressure with the pressure reducing valve.

2. The pressure accumulation fuel injection device as in claim 1, wherein
the formal abnormality determining means reduces the fuel pressure with the pressure reducing valve at timing that is posterior to the fuel injection from the injector and that is outside a fuel transfer period of the high-pressure fuel supply pump.

3. The pressure accumulation fuel injection device as in claim 1, wherein
the temporary abnormality determining means senses the fuel pressure before and after the fuel injection from the injector with the fuel pressure sensing device and temporarily determines that the fuel pressure sensing device is abnormal when change of the sensed fuel pressure is smaller than the preset temporary abnormality determination value.

4. The pressure accumulation fuel injection device as in claim 1, wherein
the temporary abnormality determining means senses the fuel pressure with the fuel pressure sensing device before and after fuel transfer from the high-pressure fuel supply pump to the common rail and temporarily determines that the fuel pressure sensing device is abnormal when change of the sensed fuel pressure is smaller than the preset temporary abnormality determination value.

5. A pressure accumulation fuel injection device having an injector that injects fuel into a cylinder of an internal combustion engine, a common rail that accumulates high-pressure fuel supplied from a high-pressure fuel supply pump and that supplies the fuel to the injector, and a fuel pressure sensing device that senses fuel pressure of the common rail, wherein the fuel injection device controls the fuel pressure of the common rail based on the fuel pressure sensed with the fuel pressure sensing device, the fuel injection device comprising:
a pressure reducing valve that reduces the fuel pressure of the common rail; and
an electronic control unit configured to:
perform a temporary abnormality determination for temporarily determining that the fuel pressure sensing device is abnormal when change of the fuel pressure sensed with the fuel pressure sensing device is smaller than a preset temporary abnormality determination value; and perform a formal abnormality determination for formally determining that the fuel pressure sensing device is abnormal when both a first change of the fuel pressure and a second change of the fuel pressure are smaller than a preset formal abnormality determination value; wherein after the temporary abnormality determination temporarily determines that the fuel pressure sensing device is abnormal, the formal abnormality determination detects the first change in the fuel pressure with the fuel pressure sensing device by reducing the fuel pressure with the pressure reducing valve after fuel injection from the fuel injector, and the formal abnormality determination detects the second change in the fuel pressure with the fuel pressure sensing device by increasing fuel transfer quantity from the high-pressure fuel supply pump after reducing the fuel pressure with the pressure reducing valve.

6. The pressure accumulation fuel injection device as in claim 5, wherein
the formal abnormality determination includes reducing the fuel pressure with the pressure reducing valve at timing that is posterior to the fuel injection from the injector and that is outside a fuel transfer period of the high-pressure fuel supply pump.

7. The pressure accumulation fuel injection device as in claim 5, wherein
the temporary abnormality determination includes sensing the fuel pressure before and after the fuel injection from the injector with the fuel pressure sensing device and temporarily determining that the fuel pressure sensing device is abnormal when change of the sensed fuel pressure is smaller than the preset temporary abnormality determination value.

8. The pressure accumulation fuel injection device as in claim 5, wherein
the temporary abnormality determination includes sensing the fuel pressure with the fuel pressure sensing device before and after fuel transfer from the high-pressure fuel supply pump to the common rail and temporarily determining that the fuel pressure sensing device is abnormal when change of the sensed fuel pressure is smaller than the preset temporary abnormality determination value.

* * * * *